United States Patent
Vadon et al.

(10) Patent No.: US 7,321,892 B2
(45) Date of Patent: Jan. 22, 2008

(54) IDENTIFYING ALTERNATIVE SPELLINGS OF SEARCH STRINGS BY ANALYZING SELF-CORRECTIVE SEARCHING BEHAVIORS OF USERS

(75) Inventors: Eric R. Vadon, Seattle, WA (US); Ronald M. Whitman, Seattle, WA (US); Randal M. Henne, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 89 days.

(21) Appl. No.: 11/202,291

(22) Filed: Aug. 11, 2005

(65) Prior Publication Data

US 2007/0038615 A1 Feb. 15, 2007

(51) Int. Cl.
G06F 7/00 (2006.01)
G06F 17/30 (2006.01)

(52) U.S. Cl. .............. 707/4; 707/2; 707/3; 707/5; 707/10

(58) Field of Classification Search ........... 707/2–5, 707/10
See application file for complete search history.

(56) References Cited

U.S. PATENT DOCUMENTS

| | | | |
|---|---|---|---|
| 4,783,758 A * | 11/1988 | Kucera | 715/533 |
| 5,694,592 A | 12/1997 | Driscoll | |
| 6,006,225 A | 12/1999 | Bowman et al. | |
| 6,144,958 A | 11/2000 | Ortega et al. | |
| 6,564,213 B1 | 5/2003 | Ortega et al. | |
| 6,671,681 B1 | 12/2003 | Emens et al. | |
| 6,772,150 B1 * | 8/2004 | Whitman et al. | 707/6 |
| 6,918,086 B2 * | 7/2005 | Rogson | 715/533 |
| 6,976,019 B2 * | 12/2005 | Davallou | 707/6 |
| 7,152,061 B2 | 12/2006 | Curtis et al. | |
| 7,194,684 B1 | 3/2007 | Shazeer | |
| 2002/0010726 A1 * | 1/2002 | Rogson | 707/533 |
| 2002/0021838 A1 * | 2/2002 | Richardson et al. | 382/181 |

(Continued)

FOREIGN PATENT DOCUMENTS

WO 9941694 A1 8/1999

(Continued)

OTHER PUBLICATIONS

Joachims, Thorsten, "Optimizing Search Engines using Clickthrough Data," Proceedings of the 8th ACM SIGKDD international conference on knowledge discovery and data mining, ACM Press, pp. 133-142, Jul. 2002.

(Continued)

*Primary Examiner*—Tim Vo
*Assistant Examiner*—Jay A Morrison
(74) *Attorney, Agent, or Firm*—Knobbe, Martens, Olson & Bear, LLP

(57) ABSTRACT

A computer-implemented process identifies useful alternative spellings of search strings submitted to a search engine. The process takes into consideration spelling changes made by users, as detected by programmatically analyzing search string submissions of a population of search engine users. In one embodiment, an assessment of whether a second search string represents a useful alternative spelling of a first search string takes into consideration (1) an edit distance between the first and second search strings, and (2) a likelihood that a user who submits the first search string will thereafter submit the second search string, as determined by monitoring and analyzing actions of users.

59 Claims, 9 Drawing Sheets

U.S. PATENT DOCUMENTS

| | | | |
|---|---|---|---|
| 2002/0156776 A1* | 10/2002 | Davallou | 707/3 |
| 2003/0061202 A1* | 3/2003 | Coleman | 707/3 |
| 2003/0088833 A1* | 5/2003 | Miyazaki et al. | 715/533 |
| 2003/0212594 A1* | 11/2003 | Hogan | 705/14 |
| 2004/0002994 A1* | 1/2004 | Brill et al. | 707/104.1 |
| 2005/0044008 A1* | 2/2005 | Freishtat et al. | 705/26 |
| 2005/0210383 A1* | 9/2005 | Cucerzan et al. | 715/533 |
| 2005/0257156 A1* | 11/2005 | Jeske et al. | 715/745 |
| 2005/0289463 A1* | 12/2005 | Wu et al. | 715/533 |
| 2006/0161520 A1* | 7/2006 | Brewer et al. | 707/3 |
| 2006/0167842 A1* | 7/2006 | Watson | 707/3 |
| 2006/0195435 A1* | 8/2006 | Laird-McConnell et al. | 707/4 |
| 2006/0206455 A1* | 9/2006 | Kronberg | 707/3 |
| 2006/0230005 A1 | 10/2006 | Bailey et al. | |
| 2007/0016616 A1* | 1/2007 | Brill et al. | 707/104.1 |

FOREIGN PATENT DOCUMENTS

WO     WO 01/46870 A1     6/2001

OTHER PUBLICATIONS

Wen, Ji-Rong, et al., "Query Clustering Using Content Words and User Feedback," Proceedings of the 24th annual international ACM SIGIR conference on research and development in information retrieval, ACM Press, pp. 442-443, Sep. 2001.

Cucerzan, S. and Brill, E. "Spelling Correction as an Iterative Process that Exploits the Collective Knowledge of Web Users," Proceedings of Conference on Empirical Methods in Natural Language Processing (EMNLP), pp. 293-300, 2004.

Radlinski, Filip, et al., "Query Chains: Learning to Rank from Implicit Feedback," Proceedings of the 11th ACM SIGKDD international conference on knowledge discovery in data mining (KDD '05), ACM Press, pp. 239-248, Aug. 2005.

Peter G. Anick, "Adapting a Full-text Information Retrieval System to the Computer Troubleshooting Domain," Proceedings of the 17th annual international ACM SIGIR conference on research and development in information retrieval, pp. 349-358, 1994.

Dalianis, H., "*Evaluating a spelling support in a search engine,*" Lecture Notes In Computer Science; vol. 2553, Proceedings of the 6th International Conference on Applications of Natural Language to Information Systems-Revised Papers, pp. 183-190, 2002.

Kukich, K., "*Techniques for Automatically Correcting Words in Text,*" ACM Computing Surveys (CSUR), vol. 24, Issue 4, Dec. 1992.

Zhao, Y., and Truemper, K., "*Effective Spell Checking by Learning User Behavior,*" Applied Artificial Intelligence, vol. 13, No. 8, Nov. 1, 1999.

Ruch, P., "*Information Retrieval and Spelling Correction: an Inquiry into Lexical Disambiguation,*" Proceedings of the 2002 ACM symposium on applied computing, pp. 699-703, published 2002.

"*Handling Spelling Errors in Online Catalog Searches,*" Drabenstott, K.M., and Weller, M.S., Library Resources and Technical Services, vol. 40, No. 2, pp. 113-132. (1996).

\* cited by examiner

IDENTIFYING ALTERNATIVE SPELLINGS OF SEARCH STRINGS BY ANALYZING SELF-CORRECTIVE SEARCHING BEHAVIORS OF USERS

BACKGROUND OF THE INVENTION

1. Field of the Invention

The present invention relates to spelling correction algorithms, including methods for identifying alternative spellings of search strings submitted to a search engine.

2. Description of the Related Art

Many World Wide Web sites and online services provide search engine systems ("search engines") for assisting users in locating items of interest. For example, a number of web sites provide Internet search engines for locating web pages and other types of Internet content, and online services such as LexisNexis and Westlaw provide search engines for locating articles, court opinions, and other types of publications. In addition, online merchants commonly provide search engines for assisting users in locating products and other types of items represented in an electronic catalog.

To perform a search using a text-based search engine, a user submits a search query which contains or consists of a search string. The search string may consist of a single search term (e.g., "Olympics") or multiple search terms (e.g., "Olympic marathon"). Other types of elements, such as search field identifiers and logical operators, may also be included in a search query. A query server of the search engine processes the search query to identify any items that match the search string. The set of items (web pages, news articles, products, etc.) identified by the query server program is referred to as the "search result set," and is presented to the user as a list of located items. In Web-based implementations, the search result set is typically presented to the user as a hypertextual listing of the located items.

When the user of a search engine misspells a term in a search string by mistyping or failing to remember the term, the misspelled term commonly will not match any of the database terms encompassed by the search, or will match a database term that the user did not intend. Thus, the search engine may return a null (empty) search result, or a search result set containing few, if any, of the items that are relevant to the user's objective. To reduce this problem, some search engines suggest alternative strings that are similar in spelling to the user-entered search string. Frequently, however, these alternative search strings do not represent the user's intent, or otherwise are not helpful to the user.

SUMMARY OF THE INVENTION

The present invention provides a computer-implemented process for identifying search string spelling changes, such as a change from STRING1 to STRING2, that are likely to be helpful to users. The process takes into consideration the self-corrective spelling changes made by users, as detected by programmatically analyzing search histories of a population of search engine users. As a result, the identified spelling changes tend to be highly useful for correcting or otherwise modifying search strings submitted by users.

In one embodiment, spelling change events are detected by analyzing sequences of search strings submitted by individual users. For example, if a user submits a first search string, and subsequently submits a second search string, the pair of submissions may be treated as a spelling change event if the first and second search strings are sufficiently similar in spelling. The amount of time between the two submissions, and/or the actions performed by the user (if any) between the two submissions, may also be evaluated to determine whether, or to what extent, the pair of submissions should be interpreted as an intended spelling correction, and therefore taken into consideration.

The spelling change events detected via this process are aggregated across a population of users, and are programmatically analyzed on an aggregated basis to identify or predict spelling changes that are likely to be useful to users. For example, the process may predict that users who search for STRING1 are likely to benefit from searching for STRING2, which is similar in spelling. This prediction may, for example, take into consideration one or more of the following: (1) whether users who search for STRING1 thereafter search for STRING2 relatively frequently; (2) whether spelling changes from STRING1 to STRING2 occur significantly more frequently than spelling changes from STRING2 to STRING1. Other types of user actions, such as actions reflective of whether a particular search query was successful, may additionally or alternatively be taken into consideration.

Spelling changes identified as being potentially useful may be used in a variety of ways to assist users in locating items. For example, when a user submits a search string to conduct a search, one or more alternative strings that are similar in spelling may be suggested to the user. Alternatively, the submitted search string may automatically be replaced with an alternative string, or the query may automatically be expanded by logically OR-ing the original string with an alternative string.

The invention may be used to facilitate searches for any of a variety of different types of items, including but not limited to web sites, web pages, other types of documents, news articles, journal articles, products represented in an electronic catalog, auctions, business listings, documents on a corporate intranet, people, images, music files, podcasts, video clips, blogs, and television shows. In addition, the invention can be implemented as part of any type of interactive system that supports text-based searches, including but not limited to web site systems, online services networks, interactive television systems, and systems that support searching by voice via utterances of individual characters.

The spelling change analysis methods of the invention may also be used to analyze spelling changes made by users via document spell checking programs. In addition, the spelling changes identified as being useful can be used to assist users in correcting spelling errors in documents.

BRIEF DESCRIPTION OF THE DRAWINGS

These and other features of the invention will now be described with reference to the drawings summarized below. These drawings and the associated description are provided to illustrate specific embodiments and applications of the invention, and do not limit the scope of the invention.

Figure 1:
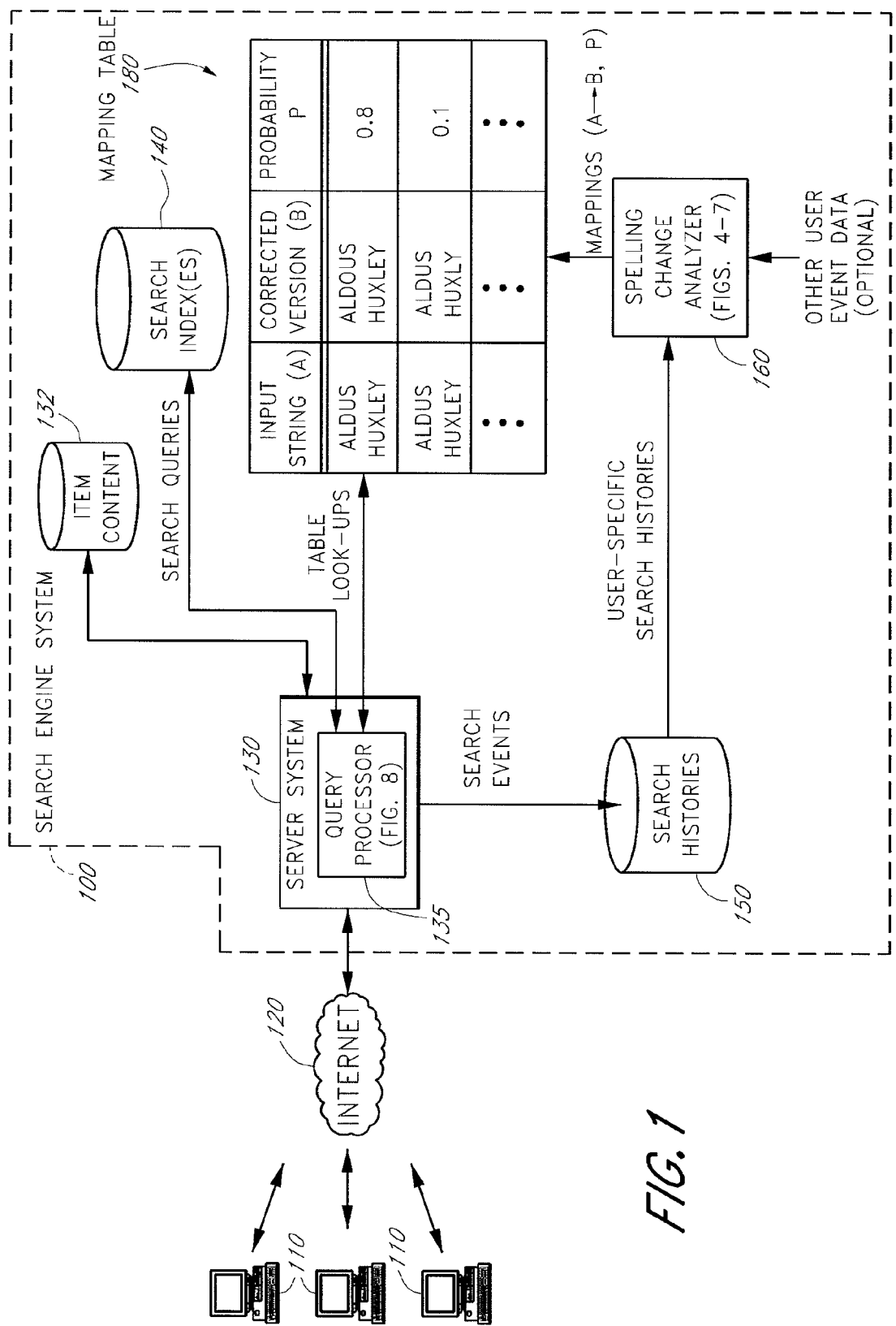
FIG. 1 illustrates the components and process flow of a search engine system according to one embodiment of the invention.

Reference numbers are re-used throughout the drawings to identify components that are identical or functionally similar. The first digit of each reference number identifies the drawing in which the referenced item first appears.

DETAILED DESCRIPTION OF SPECIFIC EMBODIMENTS

Specific embodiments of the invention will now be described with reference to the drawings. These embodiments, and their various implementation-specific details, are set forth in order to illustrate, and not to limit, the invention. The scope of the invention is defined by the claims.

I. Overview

One aspect of the invention involves a computer-implemented process for detecting and analyzing the "self-corrective" actions of a population of search engine users to extract information for assisting subsequent users in correcting or varying their search queries. In one embodiment, sequences of search string submissions of individual users are analyzed to detect spelling change events. For example, suppose that a user conducts a search for KIOTO PROTOCOL, and shortly thereafter (possibly after submitting one or more other search queries) searches for KYOTO PROTOCOL. This "transition" from one search string to another may be treated as a spelling change event since the two search strings are similar in spelling and were submitted close in time.

Spelling change events detected via this process are aggregated across users, and are analyzed in aggregate to identify spelling changes that are likely to be useful to subsequent users. This process may involve the application of one or more statistical rules to the spelling change event data. As one example, a rule may be applied that, based on the actions of all users who sought to correct a particular search string, seeks to identify the similarly spelled search strings to which users most frequently transition. This rule is based on the assumption that if users who attempt to correct STRING1 do so relatively frequently by submitting STRING2, STRING2 is likely a useful alternative for STRING1.

As another example, a "difference of odds" rule may be applied that takes into consideration whether users who transition between two similarly spelled search strings, STRING1 and STRING2, tend to do so in a particular direction, STRING1→STRING2 or STRING2→STRING1. This rule is based on the assumption that users who spell a search string correctly typically will not go on to submit a misspelled version of the string, while users who initially misspell the search string will frequently attempt to correct the misspelling. For instance, suppose that historical query submissions of a population of users reveal that users tend to submit STRING1 followed by STRING2 significantly more frequently than they submit STRING2 followed by STRING1. Based on this historical data, the difference-of-odds rule may identify STRING2 as a potentially useful alternative to STRING1, and may conclude that STRING1 is not a useful alternative to STRING2. Stated differently, the difference-of-odds rule may identify STRING2 as likely being a "corrected" version of STRING1.

In one embodiment, multiple statistical rules are applied to the detected spelling changes, with each serving as a filter for removing spelling changes that are not likely to be useful. For example, for a given spelling change from STRING1 to STRING2, a first rule may filter out this spelling change (i.e., identify STRING2 as a non-useful alternative to STRING1) if relatively few users who made a spelling change to STRING1 did so by submitting STRING2. If the spelling change is not filtered out by this first rule, a difference of odds rule may filter out the spelling change if transitions from STRING1 to STRING2 have not occurred significantly more frequently than transitions from STRING2 to STRING1.

Various other rules and criteria may additionally or alternatively be used to evaluate the utility of particular spelling changes. For example, the analysis may take into consideration certain post-query-submission user actions that evidence whether particular search query submissions were successful. For instance, the analysis may take into consideration whether users' search-result browsing actions reveal a greater level of interest in the results of one search string over another, similarly-spelled search string.

The "corrected" search strings (also referred to as "alternative" strings or spellings) identified via this analysis process may not be technically correct in spelling because they are derived from users' self-corrective query attempts, which may or may not be successful. (Thus, the term "correct" and its derivatives, as used herein, does not mean completely "error free.") However, for a given string STRING1 and an identified "corrected" version STRING2, STRING2 is generally more likely than STRING1 to be free of spelling errors. In addition, regardless of whether STRING2 is misspelled, it is likely, in the illustrated embodiments, to be a useful alternative to STRING1. In this regard, a search string that includes a misspelled term may be useful in some cases, such as if the misspelled term appears sufficiently frequently in the data repository being searched to provide useful search results.

In the following description, a spelling change or "transition" from string A to string B is represented as A→B or (A, B). This transition need not be immediate; for example, the user may perform one or more intervening actions (including submissions of other search strings) between the submissions of A and B. Where a spelling change from A to B is selected as potentially being useful to users, the ordered pair of search strings is referred to as a "mapping."

II. Search Engine Components (FIG. 1)

The description in this and the following subsections is exemplary of particular ways of practicing the invention. Other ways of practicing the invention will be apparent to those skilled in the art.

FIG. 1 illustrates the components and general process flow of a search engine system 100 ("search engine") in accordance with one embodiment of the invention. The search engine 100 is accessed by user computing devices 110, such as PCs, Personal Digital Assistants, wireless phones, set top television boxes, etc. over a computer network such as the Internet 120. Typically, the search engine system 100 is implemented as part of a web site system, although the invention is not so limited. The search engine 100 includes a server system 130 that provides access to a repository 132 of item content of, or associated with, one or more types of items (web pages, articles, products, etc.) for which users can conduct searches.

The server system 130 receives requests from the user computing devices 110. These requests include search queries that are submitted by users to find desired items represented in the item content repository 132. The search queries are processed by a query processor 135, which accesses one or more search indexes 140 to identify responsive items. Different indexes may, in some embodiments, be provided for different collections or categories of items. For example, one search index may be provided for searching the World Wide Web, while one or more other search indexes may be provided for searching an electronic catalog associated with the search engine system.

As illustrated in FIG. 1, the server system 130 maintains search histories reflective of sequences of search queries submitted by individual users. These search histories may be maintained in any appropriate type of data repository 150, such as a chronological log file or a relational database, that preserves information about the order in which particular search queries were submitted by individual users. In one embodiment, the event data recorded for each search query submission includes the submitted search string (which may include any number of search terms), a session ID of the user's browsing session, and if applicable, the item collection or category searched. Other data elements, such as a time/date stamp and a user identifier, may also be included. The search event data may, in some embodiments, be stored together with event data descriptive of other types of user actions (e.g., search result "click thru" events, other URL selection events, item-related transactions, etc.).

The spelling correction feature in the illustrated embodiment is realized through a spelling change analyzer 160, and by a mapping table 180 that stores search string-correction mappings generated by the spelling change analyzer. The spelling change analyzer 160 is responsible for (1) analyzing the event data stored in the search histories repository 150 to identify spelling changes made by users, and (2) collectively analyzing the actions of users who made these spelling changes to evaluate whether the spelling changes are likely to be useful to users who conduct subsequent searches. The spelling changes identified as being useful are stored in the mapping table 180, which in turn is used by the query processor 135 to assist users in correcting or modifying their search queries.

In one embodiment, the spelling change analyzer 160 detects the spelling changes by comparing the spellings of specific pairs of search strings that were submitted during the same browsing session (and thus by the same user). The spellings may be compared using an edit distance algorithm, and/or any other algorithm(s) for comparing spellings of strings. In this "session-based" embodiment, a user's submissions of two similarly spelled search strings, A and B, during the same browsing session may be treated as a spelling change event even though the user may have submitted one or more intervening search strings. In other embodiments, a user's submissions of two similarly spelled search strings may be treated as a spelling change event only if no intervening search strings were submitted, or only if the submissions occurred within a selected time period or number of clicks of each other.

To evaluate the utility of a particular spelling change from A to B in one embodiment, the spelling change analyzer 160 considers how frequently users who attempt to correct A do so by submitting B. (As discussed below, this may be accomplished by calculating a probability that a user who makes a spelling change to A will do so by submitting B.) The spelling change analyzer 160 may also consider whether users transition from A to B significantly more frequently than they transition from B to A, as mentioned above. The analysis may be limited to a particular time segment of event data, such as the last N days or weeks of data; alternatively, the analysis may take into consideration all collected event data, but with greater weight applied to more recent events.

As depicted by the arrow labeled "other user event data" in FIG. 1, the spelling change analyzer 160 may additionally or alternatively consider one or more other types of user actions in evaluating the utility of particular spelling changes. For example, for a given spelling change from A to B, the spelling change analyzer 160 may consider user actions reflective of whether the users who switched from A to B were more satisfied with the results of B than the results of A. For instance, the fact that users typically spend more time viewing the search results of B than the search results of A may be taken as evidence that B is a useful replacement for A.

The "other user event data" shown in FIG. 1 may also include data regarding intervening actions performed by users between submissions of A and B. These intervening actions may, for example, reveal that a user had likely already "moved on" to a new search objective before submitting B. This may be the case where, for example, a user searched for A, then purchased or downloaded an item located by this search, and then searched for B. Where the user's intervening actions reveal a weak nexus between the submissions of A and B, this particular user's transition from A to B may be disregarded, or may be accorded less weight.

A particular embodiment of the spelling change analyzer 160 is illustrated in FIGS. 4-7, and is described in section IV below.

The output of the spelling change analyzer 160 is a dataset of search string mappings in the form of A→B, where B is a corrected version of A (also referred to as an "alternative" version or spelling of A). For example, one such mapping may map the key search string "Aldus Huxley" to the corrected version "Aldous Huxley." A given search string may be mapped to more than one candidate replacement. For example, "Aldus Huxley" may also be mapped to a second corrected version, "Aldus Huxly." Although the mappings in the above examples are in the form of phrase-to-phrase mappings (i.e., each search string includes multiple terms), mappings of individual terms (e.g., Kioto to Kyoto) may also be generated. In addition, the search strings included in the mappings need not consist of alphabetic characters and spaces, but rather may include other types of characters that can be included in a search string, such as numbers, symbols, and punctuation.

As depicted in FIG. 1, the spelling change analyzer 160 in the illustrated embodiment also outputs a score, in the form of a probability value P, for each mapping. For instance, the mapping of "Aldus Huxley" to "Aldous Huxley" may have a probability value of 0.8, and the mapping of "Aldus Huxley" to "Aldus Huxly" may have a probability value of 0.1. Each such probability value generally represents a probability that the associated correction is technically correct, or will otherwise be helpful to the user. In one embodiment, each probability value P more specifically represents a likelihood that if a user who submits A attempts to make a correction to A, the user will do so by submitting B.

As shown in FIG. 1, the mappings generated by the spelling change analyzer 160, including the associated probability values, are stored as respective table entries (two entries shown) in the mapping table 180. The mappings may alternatively be stored in another form. For example, the probability values may be omitted. As another example, rather than having a separate table entry for each string-tostring mapping, a single table entry could map a given search string to a ranked list of all of its alternative spellings. As yet another example, rather than storing both search strings A and B of a given mapping, one of these two strings may be stored together with an indication of the edit or edits needed to produce the other.

Typically, many thousands to millions of different entries are included in the mapping table 180, each of which maps a particular input string A to a particular alternative or corrected spelling B. Each such mapping typically represents a common misspelling made by users of the search engine 100, and a common spelling change made in an effort to correct the misspelling. The search strings included in the mappings need not consist of alphabetic strings, but rather may include numbers and possibly other types of characters. Typically, the mappings included in the table 180 represent a relatively small subset of all spelling changes observed during the relevant time period, and particularly those identified as being the most useful. As described below, the mapping table 180 may be regenerated or updated over time such that the spelling changes represented in the mapping table 180 at any given time correspond closely to current searching patterns and behaviors of users.

Some or all of the mapping table entries (A→B, P) may be stored in association with a particular search index or item collection. For example, if the search engine's user interface allows users to restrict their searches to book titles, a separate set of mappings may be generated based solely on book-search actions of users; this collection-specific set of mappings may be used solely to assist users in conducting book searches. To implement this feature, separate mapping tables 180 may be generated for each item collection that is separately searchable; alternatively, each mapping table entry may include a field which identifies the search index or indexes to which the entry corresponds.

In the particular embodiment described below, the spelling change analyzer 160 operates as an off-line process that runs once per day and operates on the N most recent days worth of collected event data, where N is an integer typically in the range of 3 to 100. The mapping table 180 in this embodiment is regenerated each time this process is run. Thus, the mapping table strongly reflects the most recent search behaviors of users. To further increase the effects of the most recent query search behaviors of users, a linear or non-linear decay algorithm may be applied to the analyzed event data such that older search query submissions are accorded less weight than newer ones. Although 1-day execution intervals are used in the embodiment described below, other execution intervals, such as 1 hour, 12 hours, 1 week, or 1 month, may alternatively be used. Further, rather than regenerating the mapping table 180 periodically, a process that continuously or periodically updates selected table entries may be used.

In operation, the query processor 135 accesses the mapping table 180 in response to search query submissions to look up alternative spellings for users' search strings. Specifically, upon receiving a search query, the query processor 135 accesses the search index or indexes 140 to identify items that are responsive to the search query, and additionally accesses the mapping table 180 to determine if there are any alternative strings for the search string entered by the user. If the search query specifies a particular item index, the table look-up operation may optionally be limited in scope to mappings that correspond to this index.

Figure 8:
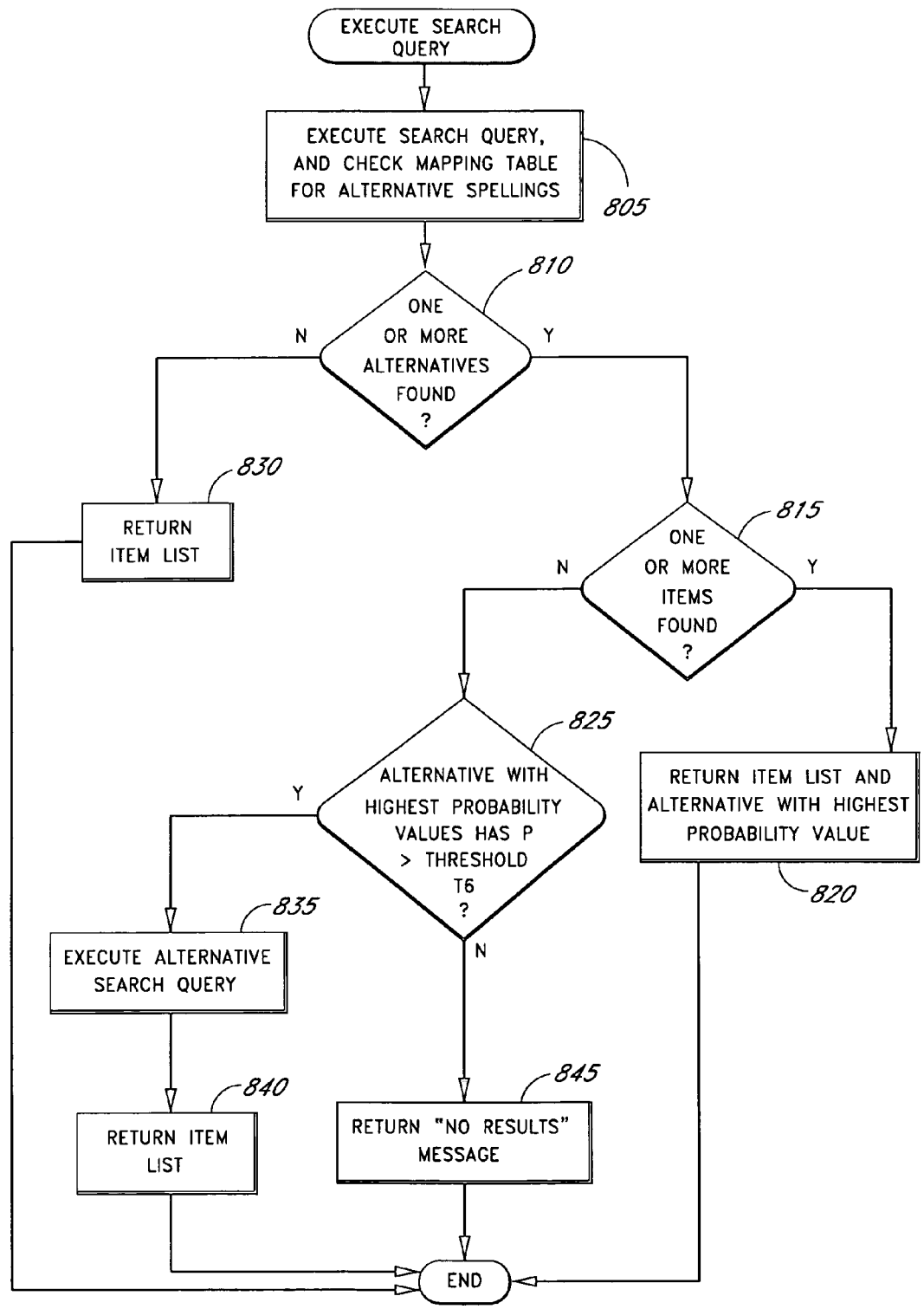
FIG. 8 illustrates how search queries may be processed by the query processor in the system of FIG. 1.

If the query processor 135 does not find any alternative strings in the table 180, the search engine 100 may simply return the search results (list of responsive items) to the user. If the query processor 135 does find one or more alternatives, it may perform one of a variety of actions to assist the user in conducting the search. For example, the search engine 100 may suggest one or more of the alternative spellings to the user. Alternatively, the search engine may automatically replace the user-entered search string with an alternative string retrieved from the mapping table 180. In one embodiment, which is depicted in FIG. 8 and described in section V below, the query processor 135 selects between these two actions (suggesting an alternative versus automatically replacing the search string) based on whether any search results were found, and based further on the probability values P of the associated mappings.

The query processor 135 may, in some embodiments, additionally or alternatively use the mapping table 180 as a query expansion tool for increasing the scope of users' search queries. This may be accomplished by logically OR-ing the original search string with one or more alternative strings retrieved from the table 180.

The query processor 135 and spelling change analyzer 160 shown in FIG. 1 may be implemented in software modules executed by one or more general purpose computers. The mapping table 180 may be implemented as a B-tree or any other appropriate data structure or structure(s), and may, for example, be maintained in solid state random access memory or magnetic disk drive storage of a server. The data repositories 132, 140, 150 shown in FIG. 1 may be implemented as databases, flat files, and/or other types of computer-based storage systems.

III. Example User Interface

Figure 2:
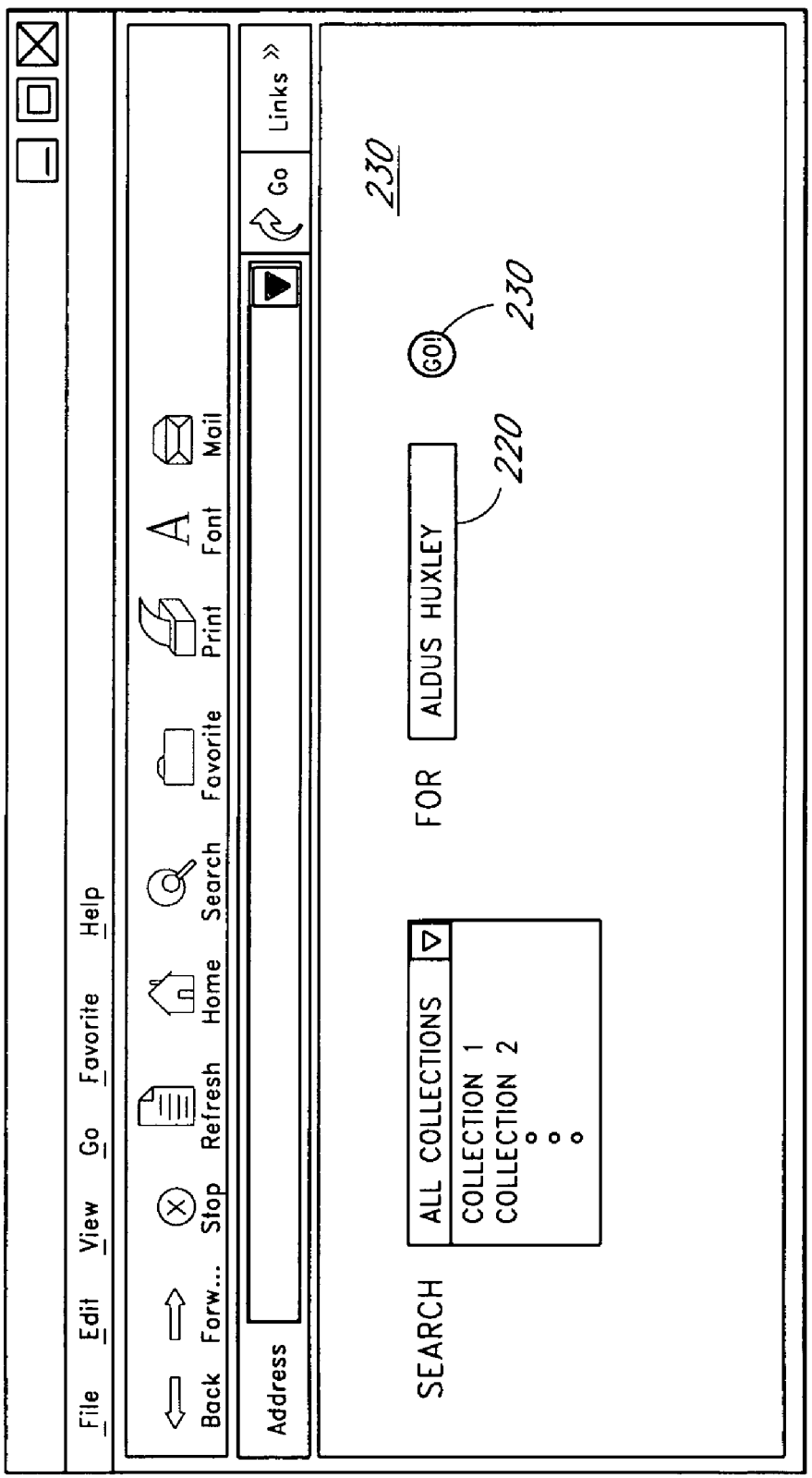
FIGS. 2 and 3 illustrate examples of a search page and a search results page, respectively, in the system of FIG. 1.
Figure 3:
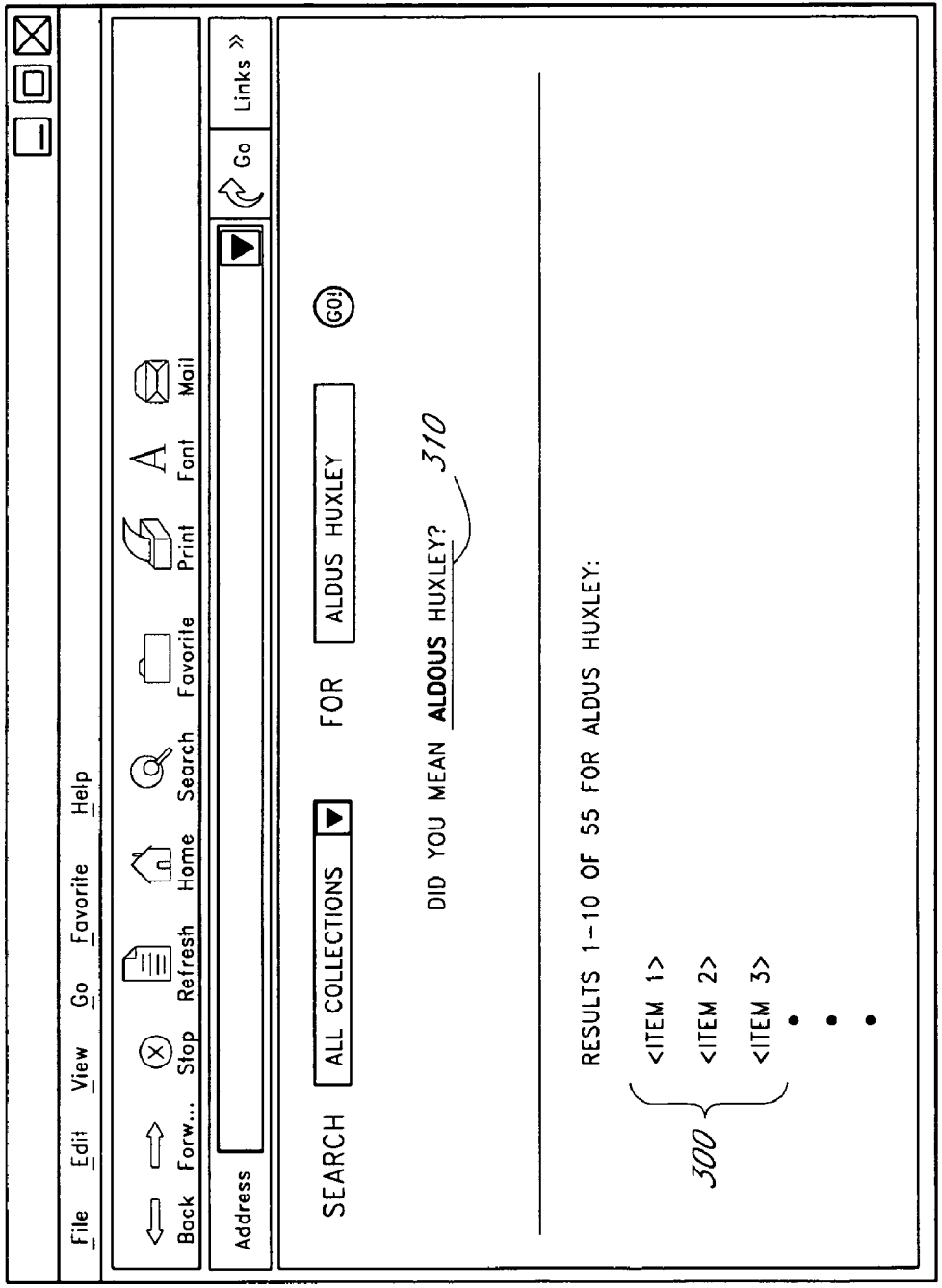

FIGS. 2 and 3 illustrate the general format of a search user interface that may be provided by the system of FIG. 1. In this particular example, the search interface is implemented using web pages displayed by a web browser. In other embodiments, the search interface may be part of a non-browser application program that runs on the user computing devices 110, or may be implemented as a voice-based interface through which users can utter the characters of their search queries.

FIG. 2 depicts a search page 210 with which a user can enter and submit a search query. In this example, a user can perform a search by entering a search string into a search field 220 and then selecting a button 230. In addition, using a drop-down list, the user can opt to limit the search to a particular collection or category of items (e.g., Web sites, news articles, books, images, etc.). The ability to limit the scope of the search to a particular item collection or category may alternatively be omitted. Although not illustrated in FIG. 2, the search interface may also include separate search fields that correspond to particular item attributes, such as subject, author, title, manufacturer, etc.

FIG. 3 illustrates an example search results page corresponding to the search query shown in FIG. 2. In this example, the search results page displays a search results listing 300 of matching items for the user-supplied search string "Aldus Huxley," and displays an alternative string 310, "Aldous Huxley." The alternative spelling "Aldous Huxley" 310 is displayed as a hypertext link that can be selected by the user to submit the alternative string in a new search query. Although a single alternative string 310 is suggested to the user in this example, two or more alternative strings may be presented to the user on the search results page, each of which is separately selectable.

In the embodiment depicted in FIG. 3, if the suggested spelling change involves less than all of the search terms, the modified term or terms are highlighted. Thus, in the example of FIG. 3, the term "Aldous" in the suggested replacement 310 is highlighted to indicate that it differs from the corresponding term "Aldus" entered by the user.

In one embodiment, a search query that is submitted by clicking on a suggested alternative string 310, rather than by entering a string into a search field 220, will not be taken into consideration by the spelling change analyzer 160 for purposes of generating the mapping table 180. This is to avoid a "self-fulfilling prophesy" effect in which a suggested alternative string is ineffective, but it is continually suggested merely because users frequently select the alternative string from search results pages. Alternatively, such query submissions may be considered but accorded less weight.

IV. Spelling Change Analyzer (FIGS. 4-7)

Figure 4:
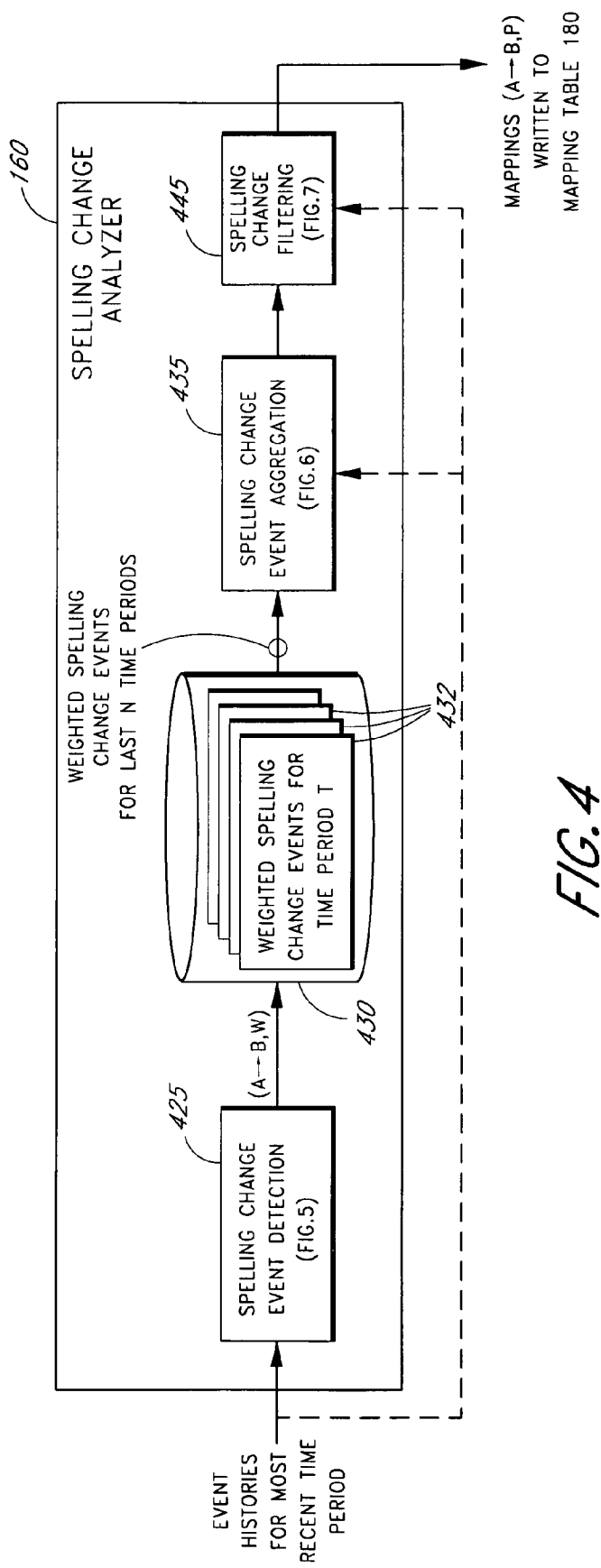
FIG. 4 is a block diagram of the spelling change analyzer of FIG. 1 according to one embodiment of the invention.

FIG. 4 is a block diagram of the spelling change analyzer 160 according to one embodiment of the invention. In this embodiment, the spelling change analyzer 160 implements a process that involves three distinct phases: a spelling change event detection phase, a spelling change event aggregation phase, and a spelling change filtering phase. Each phase is implemented by a respective software component 425, 435, 445.

As depicted in FIG. 4, each time the spelling change analyzer 160 is executed to generate a new version of the mapping table 180, the spelling change event detection component 425 initially retrieves and analyzes a most recent set of event data. This event data may consist of search query submission data, or may also include event data regarding other types of user actions (e.g., selections of search results items for viewing, downloading, purchasing, etc.). For each recorded event in this embodiment, the event data includes a session ID, such that events corresponding to the same user browsing session can readily be identified. As illustrated by the dashed line in FIG. 4, the raw event data may also optionally be analyzed during the event aggregation phase 435 and/or the filtering phase 445.

Figure 5:
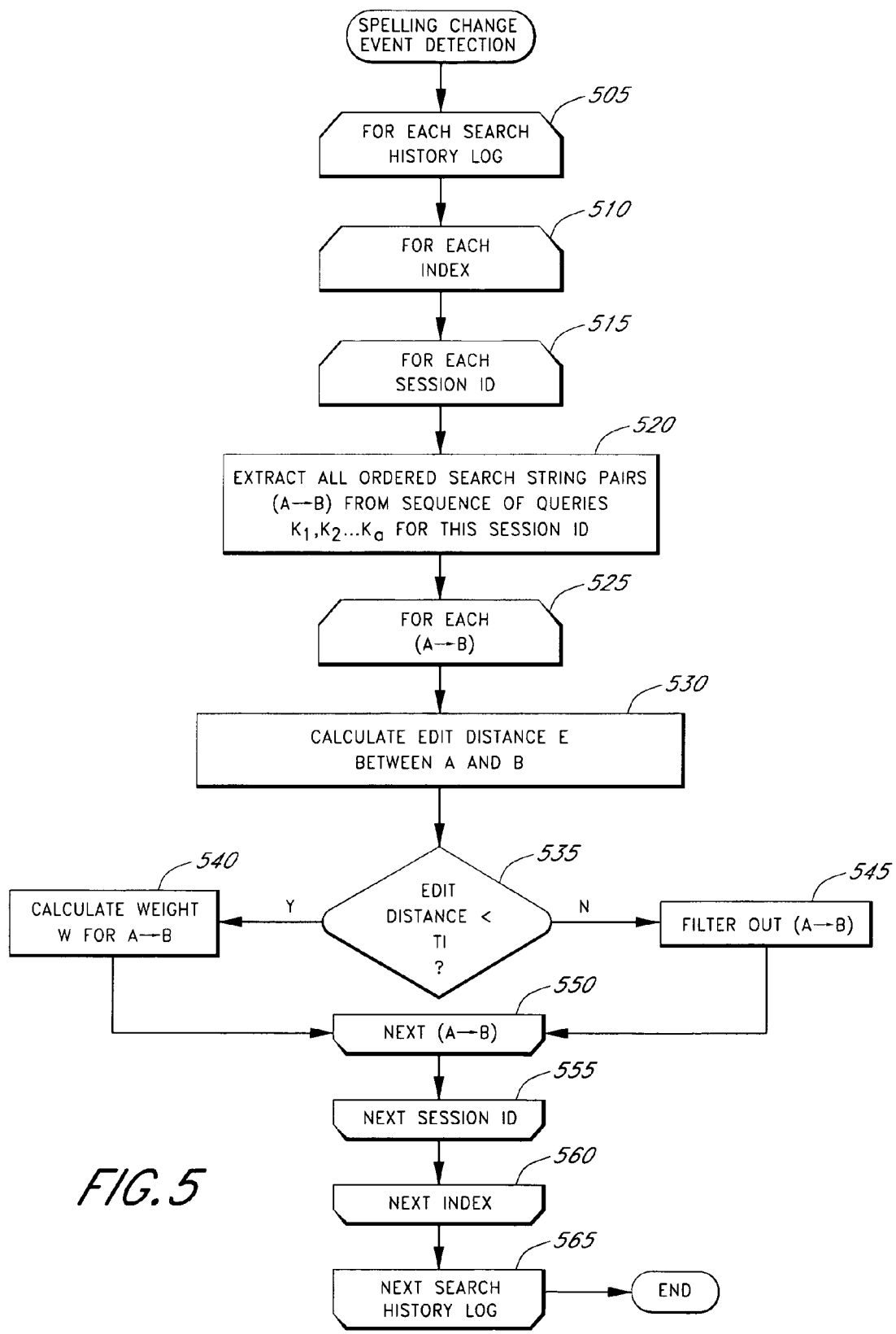
FIG. 5 illustrates the processing performed during the spelling change event detection phase of FIG. 4.

In one embodiment, the spelling change analyzer 160 is run on a daily basis, and operates on the event data collected over the preceding twenty-four hours. The processing that is performed during the spelling change event detection phase 425, in one embodiment, is illustrated in FIG. 5 and is discussed under a separate heading below. The output of the spelling change event detection component 425 is a dataset 432 of weighted spelling change events (A→B, W), many of which may correspond to the same spelling change from A to B. As discussed below, each weight value W represents the importance of the corresponding event to the subsequent analysis. The newly generated dataset 432 for the most recent time period is added to a spelling change event repository 430.

Figure 6:
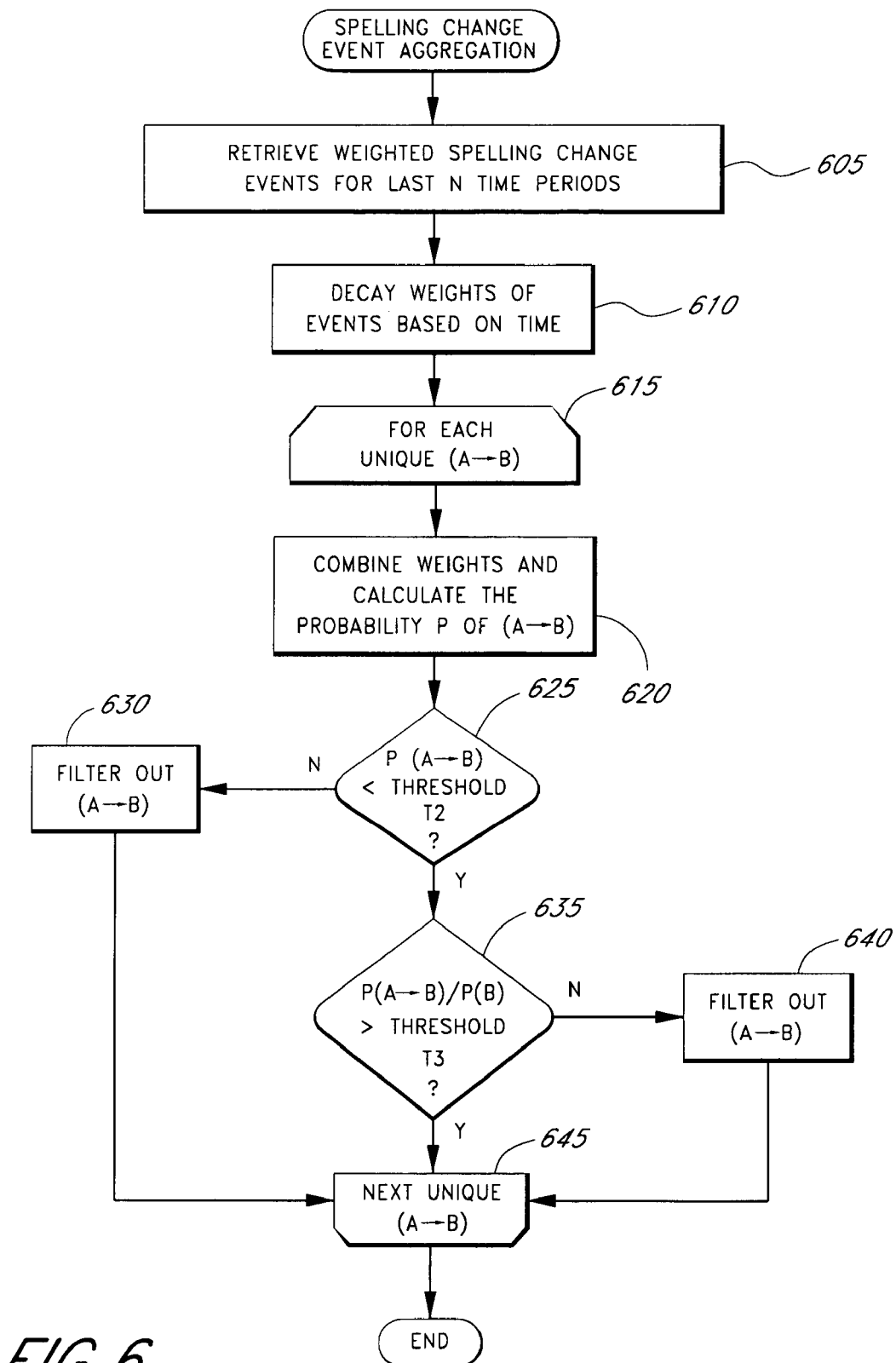
FIG. 6 illustrates the processing performed during the spelling change event aggregation phase of FIG. 4.

Once the new dataset 432 is generated, the spelling change event aggregation component 435 retrieves the datasets 432 corresponding to the last N time periods, and aggregates the events by unique spelling change. As discussed below, in one embodiment, this aggregation task involves giving successively less weight to the datasets from successively older time periods. The processing that is performed during the spelling change event aggregation phase is shown in FIG. 6 and is discussed below.

Figure 7:
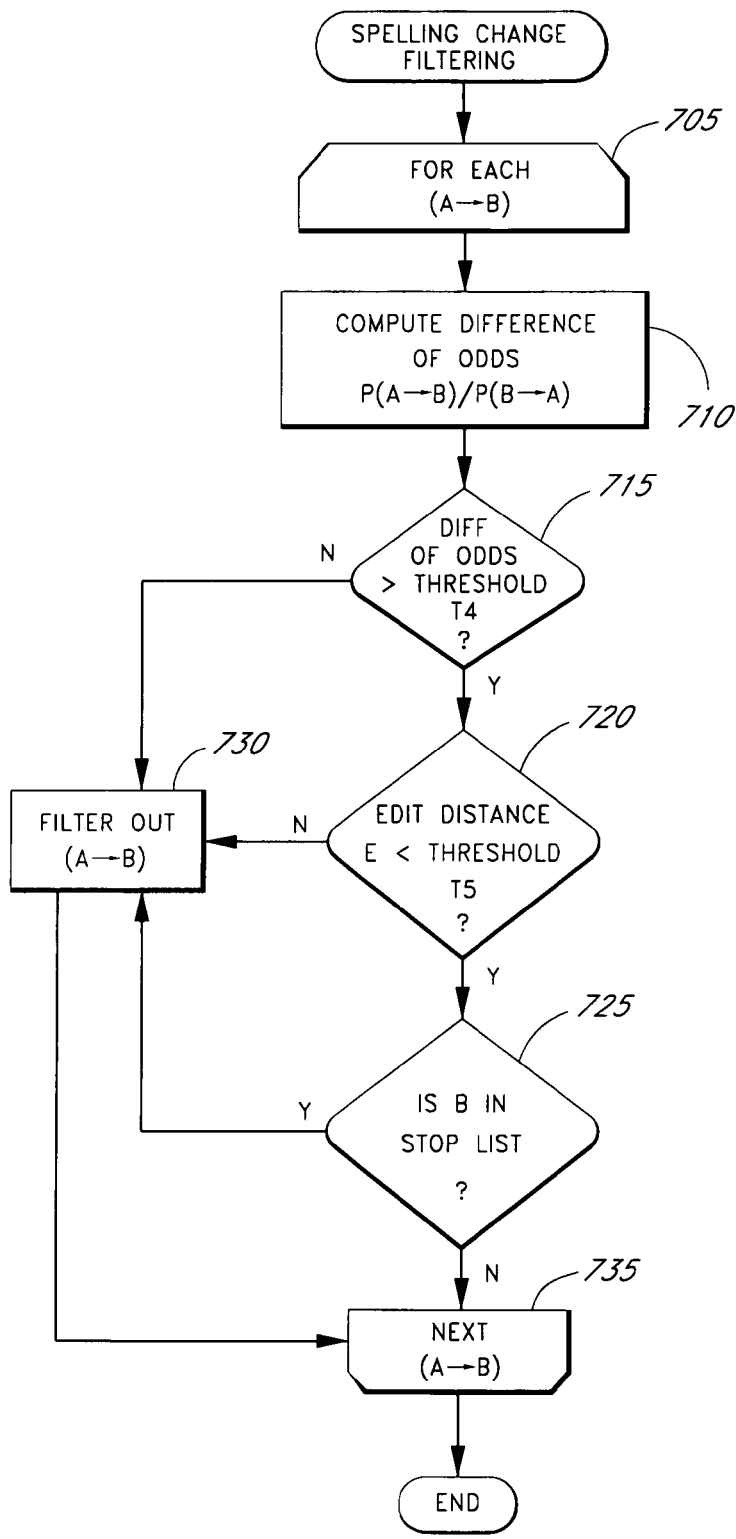
FIG. 7 illustrates the processing performed during the spelling change filtering phase of FIG. 4.

After the aggregation phase 435 is completed, the spelling change filtering component 445 filters out those spelling changes that do not satisfy certain criteria. (In the process flows described below, some spelling changes are also filtered out during the spelling change event aggregation phase.) For example, in one embodiment, spelling changes that do not satisfy a "difference of odds" threshold are filtered out. The processing that is performed during the spelling change filtering phase 445, in one embodiment, is illustrated in FIG. 7 and is described below.

Phase 1: Spelling Change Event Detection (FIG. 5)

FIG. 5 illustrates a process flow that may be used to implement the spelling change event detection phase 425 of FIG. 4. In state 505, a history log file or segment is selected for analysis. In one embodiment, each time the detection process 425 is executed, it analyzes a history file that contains the query submission data, and possibly other types of event data, for the most recent time period (e.g. the last 24 hours). In some implementations, however, multiple history files covering the same time period may be separately analyzed. For instance, history files representing registered versus unregistered users may be analyzed separately from each other, such that greater weight may be given to the actions of registered users. Thus, a loop (represented by blocks 505 and 565) is shown in FIG. 5 to accommodate the possibility that multiple history log files or segments will be analyzed.

The following is an example set of search history data that may be retrieved for analysis for two hypothetical browsing sessions, with commas used to separate distinct search query submissions.

Search history for session ID 12345:
Aldus Huxley, Alldus Huxley, Aldous Huxley, George Orwell Search history for session ID 56789:
Aldous Hucksley, Brave New World, Aldous Huxley Other information elements, such as identifiers of indexes or collections searched, event timestamps, and/or user identifiers, may also optionally be included in the retrieved data. Typically, the search history data retrieved and analyzed in a particular iteration of the spelling change event detection process 425 will include the search histories of hundreds of thousands or millions of unique users.

In state 510, the detection process 425 optionally selects an item index within the selected history file or segment, such that searches involving particular indexes may be analyzed separately from each other. In state 515, a particular session identifier is then selected.

In state 520, the detection process 425 operates within the context of the user session selected in state 515, and identifies all ordered search string pairs (A, B) from the search queries $Q_1, Q_2, Q_3, \ldots, Q_N$ submitted by the user, wherein string A has at least four characters and was submitted before B. (The constraint $A \geq 4$ is imposed in order to eliminate mappings in which string A has three characters or less.) If a particular index was selected in state 510, search queries not corresponding to this index are disregarded. For the session ID 12345 in the sample search history above, the ordered search string pairs are: ("Aldus Huxley," "Alldus Huxley"); ("Aldus Huxley," "Aldous Huxley"); ("Aldus Huxley," "George Orwell"); ("Alldus Huxley," "Aldous Huxley"); ("Alldus Huxley," "George Orwell"); ("Aldous Huxley," "George Orwell"). For session ID 56789, the ordered search string pairs are ("Aldous Hucksley," "Brave New World"); ("Aldous Hucksley," "Aldous Huxley"); ("Brave New World," "Aldous Huxley").

The search string pairs identified in state 520 may represent spelling change events if the strings of each pair are similar enough in spelling according to some measure of similarity. In states 525 and 530, the detection process 425 calculates such a measure of similarity for each pair. In the one embodiment, this is accomplished by calculating the edit distance E (the number of additions, deletions, and transpositions of letters) between the search strings of each pair (A, B). The Levenshtein method, or any other edit distance algorithm, may be used for this purpose. In other embodiments, other measures of search string similarity may additionally or alternatively be used. For example, the pronunciations of strings A and B (as may be determined using an algorithm such as Soundex) may be taken into consideration.

Although not depicted in the example above, all of the search strings represented in the analyzed search histories may initially be converted to lowercase (or uppercase), such that differences in capitalization are ignored. The search strings can also be normalized in other ways, such as by removing punctuation and extra spaces.

In state 535, the detection process 425 compares the edit distance calculated in state 530 to a threshold T1. If the edit distance of a search string pair (A, B) exceeds T1, the pair is removed from further consideration (state 545). If the edit distance falls below T1, then the pair is identified as a spelling change event. The pair may also be filtered-out if the edit distance is zero.

In one embodiment, threshold T1 is variable rather than fixed. This is useful because the effectiveness of the edit distance measure in expressing the similarity of two strings depends, in part, on the lengths of the strings. For example, the edit distance between the short strings "Cats" and "Dogs" is 3, and the two words are clearly different. However, the edit distance between the longer strings "Alldus Huxly" and "Aldous Huxley" is also 3, and the second may reasonably be considered a variation of the first. Thus, the value used for T1 may be directly proportional to the lengths of the search strings involved. For example, in one embodiment, T1 has a minimum of 1, and is incremented by one for each seven characters in A. Thus, for example, if A has 6 or fewer characters, T1=1; if A has 7 to 13 characters, T1=2, and so on. Note that A cannot have three or fewer characters because the constraint A≧4 was imposed in step 520.

In state 540, a weight W is calculated for the current spelling change event (A, B). The weight is used in part to quantify the "distance" or "nexus" between the user's submissions of A and B, and thus reflects the likelihood that (A, B) is truly a self-corrective event. For example, if the user submitted B immediately after submitting A, then this may be viewed as a stronger indication that B is a self-correction of A than if the user merely submitted A and B during the same day. In one embodiment, the weight starts at a maximum value, and is decreased or decayed, linearly or exponentially, with each intervening event between the submissions of A and B. Certain types of events, such as those evidencing a change in the user's browsing context (e.g., an item purchase), may cause a greater drop in the weight value than other types of events. Rather than analyzing the number and types of intervening events, the weight value may be based on (and inversely proportional to) the amount of time that lapsed between the submissions of A and B, as may be determined using search event timestamps.

The weight calculation in state 540 may additionally take into consideration the extent to which the user's actions reveal that the spelling change was successful. For instance, if the user selected a search result item for viewing, downloading, renting, purchasing, etc. shortly after searching for B, the weight associated with the transition from A to B may be appropriately increased.

In states 550-565, the detection process 425 loops through states 520-540 for the remaining search string pairs, user identifiers, item indexes (if considered), and history logs (if multiple logs or segments are processed). The resulting output of the detection process 425 is a dataset 432 of tuples (A, B, W), where A and B are the ordered pair of search strings of a spelling change event, and W is the calculated weight of the event. The edit distance E for each such event may also be stored for later use. As depicted in FIG. 4, this dataset 432 of weighted spelling change events is stored in the event repository 430 in association with the time period, such as the particular date, to which it corresponds.

As will be apparent, numerous variations to the process shown in FIG. 5 are possible. As one example, rather than analyzing each user's search query submissions on a session-by-session basis, the user's search query submissions could be analyzed without regard to the browsing sessions in which they occurred. For instance, if a user submits a first search query, and submits a second search query within a threshold time period or threshold number of clicks of the first search query (but in a different browsing session), this transition from the first to the second query could be considered in blocks 525-550 as a potential spelling change event even though the two submissions occurred in different sessions.

Phase 2: Spelling Change Event Aggregation (FIG. 6)

FIG. 6 illustrates the process flow of the spelling change event aggregation process or phase 435 of FIG. 4. This process 435 is executed upon completion of the process of FIG. 5. In state 605, the datasets 432 of weighted spelling change events for the N most recent time periods are retrieved, where N is a selected integer. The value of N specifies the quantity of recent event history data, or the "look-back horizon," to be used to generate the mapping table 180. For example, if each dataset 432 corresponds to a respective 1-day period and N=10, the mapping table 180 will be based on user actions occurring over the preceding ten days.

In state 610, the weights W of the spelling change events associated with all but the most recent time period are "time decayed." Time decay refers to the process of decreasing the weight of a spelling change event in direct proportion to its age. For example, assume that the tuple ("Aldus Huxley," "Aldous Huxley," 0.8) was generated by the detection process 425 of FIG. 4 one day ago. Further, assume that the tuple ("Alldus Huxley," "Aldus Huxley," 0.4) was generated two days ago. If a decay factor is 0.5 per day is used, then the weights of the tuples would be reduced to 0.4 and 0.1, respectively. Although a linear decay function is used in this example, a non-linear decay function, such as an exponential function, may be used. The effect of time-decaying the event weights is to give greater weight to recent spelling change events than to older spelling change events.

After the aged events are time decayed, the tuples in the combined dataset are grouped according to the unique spelling changes they represent. Search strings that differ only in capitalization may be treated as the same search string for purposes of this task. For example, spelling changes from "kioto" to "Kyoto," and from "Kioto" to "Kyoto," may be treated as the same.

In the context of each unique spelling change from A to B (state 615), the aggregation process 435 then calculates a probability value P in state 620. The probability value P, in one embodiment, generally represents a probability that a user who searches for A will subsequently search for B. This probability value is also generally a good indicator of both (1) whether string B is technically spelled correctly, and (2) whether string B is a useful alternative to string A. Any of a variety of different types of probability equations can be used to calculate P.

In one embodiment, the calculation of P for each unique spelling change from A to B takes into consideration (1) the number of the detected spelling change events for this spelling change, and (2) the number of detected spelling change events of A to some other string. The calculation of P may (but need not) also take into account the weights W of these spelling changes. For example, P may be calculated as follows, where $S_1$ is the sum of all weights W of spelling change events from A to B, and $S_2$ is the sum of all weights W of spelling change events from A to any string:

$$P'(A, B)=S_1/S_2$$

$$P(A, B)=P'(A, B)-\alpha*sqrt(P'*(1-P'(A, B))/S_1+k)$$

The first equation above computes the "observed probability" of a spelling change of A to B based on the proportion of detected spelling change events from A to B and from A to some other string (as modified by the event weights). The second equation calculates the actual probability value P based on the observed probability, and takes into account the total number of detected spelling change events of A to B (as modified by their weights). This second equation is a mechanism for adjusting the observed probability based on the amount of spelling change event data that exists for (A, B). Specifically, P tends to be lower if the amount of event data for this spelling change is small, and tends to be higher if the amount of data is large. A large quantity of event data for a given spelling change typically means that a large number of unique users made this spelling change during the relevant time period. However, to ensure that a single "user," such as an automated agent, does not unduly influence the results, duplicate spelling change events from the same user or session may be filtered out prior to calculating P.

In the second equation above, $\alpha$ represents the number of standard deviations, and is typically set to 1. The constant k is typically set to 2 or 3, and is used to account for undetected spelling change events.

In state 625, the aggregation process 435 compares the calculated probability value P to a confidence threshold T2, such as 0.01. This step is designed to filter out those spelling changes with a low probability value. If P is below T2, it is removed from further consideration by the spelling change analyzer 160.

If P is above T2, the aggregation process 435 calculates, for a given spelling change of A to B, another value called "lift." The lift value reflects the likelihood that a user will make a correction from A to B above and beyond random chance. In one embodiment, the lift for a spelling change of A to B is calculated as follows, where P(B) represents the probability of a user simply submitting B to the search engine:

$$lift=P(A, B)/P(B)$$

In state 635, the calculated lift is compared to a threshold T3. This comparison essentially signifies that a user should be at least T3 times more likely than chance to submit search string B after submitting search string A. If the lift is less than T3, the spelling change is removed from further consideration by the spelling change analyzer. T3 may typically be in the range of 10 to 20.

In state 645, the aggregation process 435 loops back to state 615 for any remaining unique spelling changes in the dataset. In the illustrated embodiment, the resulting output of the aggregation process 435 is a dataset of tuples (A, B, P), where P is the calculated probability value or score for a spelling change from A to B.

Phase 3: Spelling Change Filtering (FIG. 7)

The spelling change filtering phase 445 of the spelling change analyzer 160 involves filtering the unique spelling changes output by the aggregation phase 435 based on one or more rules. This phase may be omitted entirely, and the output from the aggregation phase 435 may be used to generate the mapping table 180 of FIG. 1. However, the processing performed in the filtering phase 445 is useful for removing from consideration detected spelling changes that involve similar strings and have a high probability value, but are not sufficiently likely to be helpful to users.

FIG. 7 illustrates the processing performed during the filtering phase 445. In state 705, a unique spelling change of A to B is selected from the dataset of weighted spelling changes. In states 710 and 715, a "difference of odds" analysis is performed on the selected spelling change. This analysis is based on the assumption that a spelling change from A to B is likely to be accurate or useful only if users transition from A to B significantly more frequently than they transition from B to A.

In one embodiment, the difference of odds D is calculated as D=P(A, B)/P(B, A), where P represents the probability value for the spelling change as calculated during the aggregation process 435. D may alternatively be calculated using some other metric, such as the raw event counts corresponding to (A, B) and (B, A). If D is below or equal to the threshold T4 in block 715, the spelling change of A to B is removed from further consideration by the spelling change analyzer 160. If the dataset does not include data for a spelling change from B to A, the threshold T4 may be treated as met.

As an example, assume a threshold T4 of 5, and assume that the spelling changes of ("dvd player", "dvd players") and ("dvd players," "dvd player") have probability values of 0.6 and 0.4 respectively. The probability values are assumed to be relatively close because there is no clear reason for correcting in one direction versus the other. In this case, D would equal 1.5, which is less than 5. Thus, the spelling change of "dvd player" to "dvd players" would be filtered out. In contrast, consider the spelling changes of ("Aldus Huxley," "Aldous Huxley") and ("Aldous Huxley," "Aldus Huxley"), with probability values of 0.9 and 0.1 respectively. Here, the probability value of ("Aldous Huxley," "Aldus Huxley") is assumed to be low because it is unlikely that many users would submit the incorrect spelling "Aldus Huxley" after submitting the correct spelling "Aldous Huxley." In this case, D would equal 9, which is greater than 5. Thus, ("Aldus Huxley," "Aldous Huxley") would not be filtered out.

The threshold value T4 may be static or dynamic. In one embodiment, the threshold T4 for a given spelling change (A, B) may vary with the edit distance E between A and B. For example, if the edit distance E is particularly small (i.e., the strings A and B are very similar), then T4 may be decreased to provide greater leeway in satisfying the comparison of state 715. Conversely, if E is large, T4 may be increased to make the comparison more difficult to satisfy.

In states 720 and 730, the edit distance E for each spelling change (A, B) is re-evaluated to take into consideration the difference of odds D calculated in state 710. Specifically, the edit distance E may be compared against a threshold T5 that varies with D. If D is fairly small, such as slightly larger than T4, a relatively low value may be used for T5 to require A and B to be very similar in spelling. Conversely, if D is large, a larger value may be used for T5, or the comparison of state 720 may be omitted altogether. Threshold T5 could additionally be made dependent upon the value of P for the particular spelling change, such that a greater edit distance is tolerated when P is relatively high. If the edit distance E for the current the spelling change (A, B) does not equal or exceed T5, the spelling change is filtered out in state 730.

As depicted by state 725, the spelling change (A, B) is also filtered out if B is on a stop list. In one embodiment, the stop list contains a list of strings that are not to be used as alternative search strings. These strings may be determined by human analysis, and/or through an automated process. For instance, the stop list may include common search strings which, based on an automated analysis, rarely lead to the selection or the purchase of a search result item. Although not depicted in FIG. 7, the spelling change (A, B) may also be filtered out if B produces a null query result, as may be determined by executing a search query for B.

In state 735, the filtering process loops back to state 705 for any remaining spelling changes. The output from the filtering process 445 constitutes the output of the spelling change analyzer 160, and comprises a dataset of tuples (A, B, P), where P is the probability value associated with a spelling change from A to B. This dataset may be stored as a B-tree, or other look-up structure, to create the mapping table 180. Although the probability values are stored in the mapping table 180 in the illustrated embodiment, they may alternatively be discarded.

V. Search Query Processing Flow (FIG. 8)

FIG. 8 illustrates one example of a process that may be implemented by the query processor 135 of FIG. 1 to respond to a search query from a user, and where applicable, to assist the user in correcting or varying the spelling of the submitted search string. This process may be executed whenever a search query is received from a user/computing device 110, or whenever a search query of a particular format is received (e.g., one that lacks field restrictions).

In state 805, the search query is executed to identify any matching items. In addition, the mapping table 180 is accessed to determine whether any alternative spellings exist for the received search string; in some embodiments, this may involve checking for table entries (mappings) that correspond to the particular search index or item collection being searched. As depicted by states 810 and 830, if no alternative spellings are found in the mapping table 180, the matching-item list (or a portion thereof) representing the search results of the query are returned to the user, and the process ends.

If one or more alternatives spellings are found in the mapping table 180, the number of items found is considered in state 815. If the number of items found is greater than zero, the alternative with the highest probability value P is selected from the mapping table 180. In state 820, this "top ranked" alternative is returned to the user with the matching-item list, and is suggested as an alternative spelling (see example search results page shown in FIG. 3). Rather than suggesting a single alternative spelling, two or more alternative spellings could be suggested on the search results page.

If the number of items found is equal to zero, then the probability P of the top alternative is compared to a threshold T6 (state 825). If P is less than or equal to T6, then a null search result is returned to the user (state 845). In this scenario, a list of the alternative spellings (if any) for the user-supplied search string may optionally be presented on the null search results page.

If the probability P associated with the top alternative spelling is greater than threshold T6, then the user-supplied search string is replaced with this top alternative and the search query is re-executed (state 835). The results (list of matching items) of this modified search are then returned to the user for display (state 840). In this scenario, a message may be displayed identifying the substitution made to the user's search string.

In should be noted that the search string processed via the method of FIG. 8 may consist of a single misspelled search term (e.g., the term "kioto"). In this regard, unlike some prior art methods that use other terms within the search query to predict the correct spelling of the misspelled term, the methods disclosed herein are capable of correcting (or suggesting corrections to) single-term search queries.

As will be appreciated from the foregoing, the FIG. 8 process can be altered in a variety of ways to achieve the goal of assisting search engine users in refining and correcting their search queries. For example, an alternative spelling may always be suggested to the user when found in the mapping table 180, regardless of its probability value or the number of items found by the original search. As another example, the original query may automatically be expanded to include one or more top-ranked alternative spellings.

In addition, the process shown in FIG. 8 can be used in combination with pre-existing spelling correction methods. As one example, the process shown in FIG. 8 can be implemented in parallel with the spelling correction process described in U.S. Pat. No. 6,144,958 (i.e., both processes can be used independently of one another to identify alternatives for the user-supplied search string). In many cases, these two processes may identify different alternative strings, in which case each such alternative string can be presented to the user.

VI. Example Web Site Implementation (FIG. 9)

Figure 9:
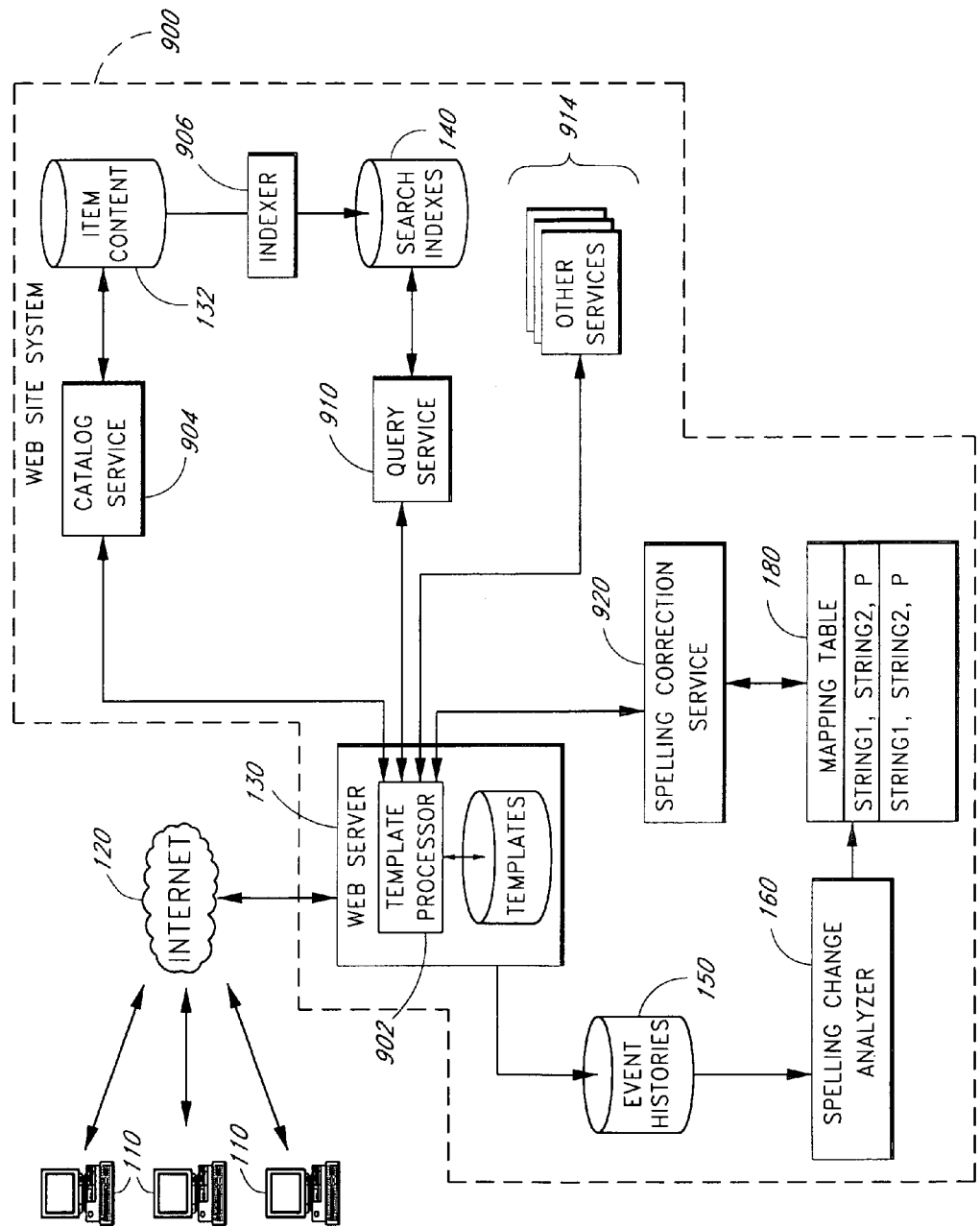
FIG. 9 illustrates one example of how the system of FIGS. 1-7 may be implemented as part of a web site system that provides access to an electronic catalog of items.

FIG. 9 illustrates one example of how the system of FIG. 1 may be implemented as part of a service-based web site system 900 that provides access to an electronic catalog of items, such as products that can be ordered via the system 900. Some of the reference numbers of FIG. 1 are reused in FIG. 9 to show a correspondence between components. In the example embodiment of FIG. 9, the server 130 of FIG. 1 is a web server that responds to page requests from the user computing devices 110, each of which runs browser software. In large scale systems that can accommodate tens of thousands of concurrent browsing sessions, the web server system is typically implemented using a number of replicated physical servers (e.g., one hundred or more). In one embodiment, when a user 110 accesses the web site system, the web server 130 starts a new session (assigns a new session ID) if the user has not accessed the system in the preceding twenty four hours.

The web server 130 communicates over a network with various services, including a catalog service 904, a query service 910, and a spelling correction service 920. The web server 130 may also communicate with a variety of other services 914, such as services for managing user account data, processing orders, etc. Each service 904, 910, 914, and 920 may be implemented as one or more physical servers that execute associated service code.

As illustrated in FIG. 9, the web server 130 includes a template processor 902 that accesses a repository of web page templates. These templates specify the processing that is performed, including service requests that are issued, for purposes of dynamically generating particular web pages. For example, when a user requests a web page associated with a particular product or product category, the associated template causes the template processor 902 to request the associated catalog content from the catalog service 904. The catalog service 904 may retrieve this content from a repository 132 of item content, which may, for example, include descriptions and images of particular products represented in the electronic catalog. The item content stored in the repository 132 is indexed periodically or continuously by an indexer 906 to generate the search index or indexes 140 used to execute interactive searches.

When a user submits a search query, the template processor 902 passes the search query to the query service 910 and the spelling correction service 920 via respective service calls. The query service 910 responds by using the associated search index to generate and return a list of any matching items, which may consist of matching products in the case of a catalog search. The spelling correction service 920 responds to the search query by using the mapping table 180 to look up any alternative search strings, and by returning these alternative strings and their probability values to the template processor 902. The template processor 902 may use the information returned by the query service 910 and spelling correction service 920 to generate a search results page according to blocks 810-845 of FIG. 8.

In some embodiments, the alternative strings that are returned by the spelling correction service 920 may be dependent upon the type of search being conducted. For example, if the user is conducting a book search (where books represent one of multiple categories of products represented in the catalog), the alternative strings may be based solely or primarily on book searches conducted by others users. As discussed above, this may be accomplished by including in each mapping table entry an identifier of the search index or indexes to which the entry corresponds, and/or by generating different mapping tables 180 for different search indexes.

With further reference to FIG. 9, the web server 130 reports search query submission events, and optionally other types of events (e.g., all click events), to an event histories repository 150. This repository 150 may, for example, be implemented as a web log file as is well known in the art. Alternatively, the event histories repository 150 may be implemented using a relational database system, as described, for example, in U.S. Pub. No. 2005/0033803 A1. The event history repository 150 may also store event data collected from other sources. For example, search/event histories could be collected from other web site systems that implement search engines, such that the mapping tables 180 reflects search activities monitored over multiple search engine systems and web sites.

Event history data collected in the event histories repository 150 is analyzed by the spelling change analyzer 160 to generate the mapping table or tables 180. The process depicted in FIGS. 4-7 may be used for this purpose. Alternatively, a process may be used that analyzes the event histories, and makes updates to the mapping table 180, substantially in real time as corresponding browsing sessions occur.

In one embodiment, the spelling correction service 920 is implemented as a web service that can be accessed directly by other computer systems via the Internet. Thus, for example, other search engine systems (e.g., those of other web sites) can send service requests to the spelling correction service 920 to obtain alternative spellings of particular search strings. In this regard, the alternative spellings supplied by the spelling correction service 920 are typically useful to users of other, independent web sites and search engine systems, regardless of whether these other systems supplied any of the event data used to generate the mappings.

The spelling change analyzer 160 could similarly be implemented as a web service. For example, the analyzer 160 could be configured to accept search history data in a standard format, such as a standard log file format, and to return a corresponding dataset of search string mappings (A, B, P). Thus, for example, other search engine providers could use the spelling change analyzer 160 to generate search-engine-specific mapping tables 180 for their respective search engines, and could use these mapping tables to assist their users in modifying search queries.

VII. Spell-Checking of Documents

The string-to-string mappings generated in accordance with the invention can also be used to enhance existing spell checking programs used to spell-check documents. Such document spell checkers are commonly included in word processing programs such as Microsoft Word, and email client programs such as Microsoft Outlook.

As one example, upon encountering an unrecognized term for which no alternative spellings (or none indicated as desirable by a user) are found in a dictionary, the document spell checker could send a service request to the spelling correction service 920 (FIG. 9) to retrieve a list of alternative spellings of this term. This list of alternative spellings—which may include author names, business names, product numbers, and other strings not commonly found in the dictionaries of document spell checkers—could then be presented to the user. These alternative spellings may be displayed together with a message indicating that they are based on actions of search engine users and may not be technically correct.

VIII. Generation of Mappings Based on Other Sources of Spelling Change Event Data The methods described herein for mapping strings to alternative strings can also be adapted for use with other sources of spelling change event data. As one example, users of a document spell checker program can be given the option to subscribe to a service that aggregates and analyzes spelling change event data. When the document spell checker of a subscribed user encounters an unrecognized term, A, the spell checker may prompt the user to select from a list, or to type in, an alternative term, B. If the user selects or types in such an alternative term, the spell checker may report the spelling change from A to B to the service. Spelling changes reported to the service from the computing devices of many different subscribers may be analyzed collectively, using the same methods as described above, to generate the mappings of strings to alternative strings. These mappings may, for example, be used as described in the preceding subsections to assist users in spell-checking documents, and/or to assist users in correcting spelling errors in their search queries.

IX. Conclusion

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the following claims.

What is claimed is:

1. A computer-implemented method, comprising:
analyzing search string submissions of each of a plurality of users to detect search string spelling change events, each search string spelling change event being an event in which a user submits a first search string to a search engine, and subsequently submits to the search engine a second search string which is similar in spelling to, but different in spelling from, the first search string, wherein the search string spelling change events are detected, at least in part, by comparing spellings of different search strings submitted by the same user, such that each detected spelling change event is specific to a particular user;

calculating weight values for the detected search string spelling change events, each weight value representing an amount of weight to be given to a corresponding search string spelling change event;

for each of a plurality of search strings included in the search string submissions, identifying one or more alternative spellings of the respective search strings, wherein the alternative spellings are identified, at least in part, by analyzing the detected search string spelling change events of the plurality of users, and the calculated weight values for such search string spelling change events, on an aggregated basis to assess whether particular search string spelling changes are useful to users, wherein the calculated weight values are used to give different non-zero amounts of weight to different search string spelling change events; and creating an association in computer storage between the search strings and the corresponding alternative spellings.

2. The method of claim 1, wherein calculating the weight values comprises, for a spelling change event in which a first user made a first search string submission followed by a second search string submission, calculating a weight value that depends upon how many intervening actions were performed by the first user between the first and second search string submissions.

3. The method of claim 1, wherein analyzing the detected spelling change events comprises assessing whether a particular search string, string B, is a useful alternative spelling of another particular search string, string A, taking into consideration how frequently users who make a spelling change to string A do so by submitting string B.

4. The method of claim 1, wherein calculating the weight values comprises, for a particular spelling change event of a first user, calculating a weight value that depends upon whether the first user selected a search result item after submitting the second search string.

5. The method of claim 1, wherein calculating the weight values comprises, for a spelling change event in which a first user made a first search string submission followed by a second search string submission, calculating a weight value that depends upon an amount of time between the first and second search string submissions.

6. The method of claim 1, wherein analyzing the detected spelling change events comprises, for a spelling change from a particular search string, string A to another particular search string, string B, analyzing actions of users who submitted string A and string B to assess a usefulness of string B to users who submit string A.

7. The method of claim 6, wherein assessing the usefulness of string B to users who submit string A comprises analyzing browsing actions of users who submitted string B to evaluate an extent to which such users viewed a search result corresponding to string B.

8. The method of claim 6, wherein assessing the usefulness of string B to users who submit string A comprises taking into consideration an edit distance between string A and string B.

9. The method of claim 6, wherein assessing the usefulness of string B to users who submit string A comprises taking into consideration whether spelling changes from string A to string B are more likely to occur than spelling changes from string B to string A.

10. The method of claim 1, wherein the method comprises using the weight values to calculate probabilities of occurrence of particular spelling changes, and using said probabilities of occurrence to assess whether particular search string spelling changes are useful to users.

11. The method of claim 1, further comprising adjusting the weight values according to a time decay function such that greater weight is generally given to recent spelling change events than to older spelling change events.

12. The method of claim 1, wherein calculating the weight values comprises weighting a spelling change event based, at least in part, on other user actions performed as part of a browsing session in which the spelling change event occurred.

13. The method of claim 1, wherein the method comprises giving more weight to recent spelling change events than to older spelling change events.

14. The method of claim 1, wherein creating the association comprises generating, in computer storage, a mapping of particular search strings of said plurality of search strings to corresponding alternative search strings.

15. The method of claim 14, further comprising using the mapping to suggest alternative search string spellings to users.

16. The method of claim 14, further comprising using the mapping to automatically correct spelling errors in search strings submitted by users.

17. The method of claim 1, wherein the method comprises assessing a usefulness of each alternative spelling based on actions of multiple users.

18. A computer implemented method, comprising:

identifying a first search string and a second search string that were separately submitted to a search engine by at least one user;

programmatically assessing whether the second search string represents a useful alternative spelling of the first search string, taking into consideration at least (1) a degree to which the first search string and the second search string are similar in spelling, and (2) detected spelling changes made to the first search string by each of a plurality of users, wherein the programmatic assessment comprises giving different non-zero amounts of weight to different detected spelling change events, at least some of said amounts of weight being dependent upon user actions performed during browsing sessions in which the corresponding spelling change events occurred, each detected spelling change event being specific to a particular user; and storing a result of the programmatic assessment in computer storage.

19. The method of claim 18, wherein giving different amounts of weight to different detected spelling change events comprises, for a detected spelling change event of a user between the first search string and the second search string, calculating a weight value that depends upon an amount of time between submission by the user of the first search string and submission by the user of the second search string.

20. The method of claim 18, further comprising detecting said spelling changes made to the first search string by detecting, for each of said plurality of users, a submission of the first search string followed by a submission of a similarly spelled search string.

21. The method of claim 18, wherein programmatically assessing whether the second search string represents a useful alternative spelling of the first search string comprises taking into consideration how frequently users who make corrections to the first search string do so by submitting the second search string.

22. The method of claim 18, wherein programmatically assessing whether the second search string represents a useful alternative spelling of the first search string comprises taking into consideration whether transitions from the first search string to the second search string occur more frequently than transitions from the second search string to the first search string.

23. The method of claim 18, wherein giving different amounts of weight to different detected spelling change events comprises, for a detected spelling change event of a user between the first search string and the second search string, calculating a weight value that depends upon how many intervening actions were performed by the user between submitting the first search string and submitting the second search string.

24. The method of claim 18, wherein programmatically assessing whether the second search string represents a useful alternative spelling of the first search string comprises assigning a respective weight value to each of a plurality of spelling change events from the first search string to the second search string, and combining said weight values.

25. The method of claim 18, wherein the method comprises treating the second search string as a useful alternative spelling of the first search string only if spelling changes from the first search string to the second search string have occurred substantially more frequently than spelling changes from the second search string to the first search string.

26. The method of claim 18, wherein programmatically assessing whether the second search string represents a useful alternative spelling of the first search string comprises taking into consideration an extent to which users who submitted the second search string accessed corresponding search results.

27. The method of claim 18, fUrther comprising, in response to determining that the second search string represents a useful alternative spelling of the first search string, generating, in computer storage, a mapping of the first search string to the second search string.

28. The method of claim 18, fUrther comprising, in response to determining that the second search string represents a useful alternative spelling of the first search string, suggesting the second search string to users who submit the first search string to a search engine.

29. The method of claim 18, wherein programmatically assessing whether the second search string represents a useful alternative spelling of the first search string comprises comparing a frequency of occurrence of spelling changes from the first search string to the second search string to a frequency of occurrence of spelling changes from the second search string to the first search string.

30. A computer-implemented method of processing search string submissions, the method comprising:
  receiving a first search string submitted to a search engine by a user who is conducting a search;
  selecting an alternative search string that represents an alternative spelling of the first search string, taking into consideration detected spelling changes made by prior users who have submitted the first search string, said spelling changes detected automatically by comparing search string submissions of users, and further taking into consideration weight values generated for particular spelling change events, each spelling change event and each weight value being specific to a particular user, each weight value being dependent upon one or more actions performed by the user to which the weight value corresponds, and representing a non-zero amount of weight to be given to a corresponding spelling change event; and
  in response to receiving the first search string, doing at least one of the following: (a) suggesting the alternative search string to the user, (b) executing a search with the alternative search string, and outputting a result of the search to the user.

31. The method of claim 30, wherein the method comprises accessing a mapping table to look up the alternative search string, said mapping table generated based, at least in part, on an analysis of detected spelling changes made by a plurality of users of the search engine.

32. The method of claim 30, wherein the selection of the alternative search string further takes into consideration data reflective of whether users who transition from the first search string to the alternative search string tend to select search results produced with the alternative search string.

33. The method of claim 30, wherein the alternative search string is selected based on a result of a programmatic assessment of whether the alternative search string is useful to users who submit the first search string, said programmatic assessment being based at least partly on search string spelling changes made by a plurality different users who submitted the first search string.

34. The method of claim 33, wherein the programmatic assessment is based in part upon search result viewing activity of users who submitted the alternative search string.

35. A computer-implemented method comprising:
  generating spelling change event data descriptive of detected spelling changes made by each of a plurality of computer users, wherein generating the spelling change event data comprises calculating weights that represent amounts of weight to be given to corresponding spelling change events, each spelling change event being user-specific;
  aggregating the spelling change event data, at least in part, by combining weights of like spelling change events;
  programmatically analyzing at least the aggregated spelling change event data to assess, for at least a first string and a second string, whether the second string represents a useful alternative spelling of the first string; and
  when, as a result of said assessment, the second string is identified as a useful alternative spelling of the first string, generating, in computer storage, a mapping of the first string to the second string;
  wherein aggregating the spelling change event data comprises giving different non-zero amounts of weight to different spelling change events, such that some spelling change events are given more weight than others during the programmatic analysis of the aggregated spelling change event data.

36. The method of claim 35, wherein programmatically analyzing the aggregated spelling change event data comprises taking into consideration whether spelling changes from the first string to the second string occur significantly more frequently than spelling changes from the second string to the first string.

37. The method of claim 35, wherein programmatically analyzing the aggregated spelling change event data comprises taking into consideration how frequently users who make a spelling change to the first string do so by transitioning to the second string.

38. The method of claim 35, wherein programmatically analyzing the aggregated spelling change event data comprises taking into consideration an edit distance between the first string and the second string.

39. The method of claim 35, wherein generating the spelling change event data comprises monitoring spelling changes made by users via document spell checking programs.

40. The method of claim 35, wherein the spelling change event data comprises data descriptive of spelling changes made by users to search strings submitted to a search engine.

41. The method of claim 35, further comprising using said mapping to programmatically suggest the second string to a user who enters the first string.

42. The method of claim 35, wherein the first and second strings are search strings submitted to a search engine, and wherein assessing whether the second string represents a useful alternative spelling of the first string comprises analyzing search result viewing activity of users who conducted a search using the second string.

43. The method of claim 35, wherein assessing whether the second string represents a useful alternative spelling of the first string comprises taking into consideration both spelling changes made by users from the first string to the second string, and spelling changes made by users from the second string to the first string.

44. The method of claim 35, wherein assessing whether the second string represents a useful alternative spelling of the first string comprises comparing a frequency of occurrence of spelling changes from the first string to the second string to a frequency of occurrence of spelling changes from the second string to the first string.

45. The method of claim 44, wherein comparing said frequencies of occurrence comprises giving more weight to some spelling change events than others.

46. The method of claim 44, wherein comparing said frequencies of occurrence comprises calculating a first value representing a probability of a spelling change from the first string to the second string; calculating a second value representing a probability of a spelling change from the second string to the first string; and comparing the first and second values.

47. The method of claim 35, wherein at least one of said weights corresponds to a search string spelling change event in which a user submitted a first search string and subsequently submitted a second search string, and is dependent upon one or more intervening actions performed by said user after submitting the first search string and before submitting the second search string.

48. The method of claim 35, wherein the steps of programmatically analyzing at least the aggregated spelling change event data and generating the mapping are performed in an off-line processing mode, and the method further comprises using the mapping to suggest the second string to users who submit the first string.

49. The method as in claim 1, wherein analyzing the detected spelling change events comprises assessing whether a particular search string, string B, is a useful alternative spelling of another particular search string, string A, such that the assessment takes into consideration both weighted spelling change events from string A to string B, and weighted spelling change events from string B to string A.

50. The method as in claim 1, wherein analyzing the detected spelling change events comprises assessing whether a particular search string, string B, is a useful alternative spelling of another particular search string, string A, at least in part by comparing a frequency of occurrence of spelling change events from string A to string B to a frequency of occurrence of spelling change events from string B to string A.

51. The method of claim 50, wherein comparing said frequencies of occurrence comprises giving different non-zero amounts of weight to different spelling change events between string A and string B.

52. The method of claim 50, wherein comparing said frequencies of occurrence comprises calculating a first value representing a probability of a spelling change from string A to string B; calculating a second value representing a probability of a spelling change from string B to string A, and comparing the first and second values.

53. A computer-implemented method of detecting and analyzing search string spelling changes made by users, comprising:
  identifying a first search string submission event in which a user submitted a first search string to search an electronic repository;
  identifying a second search string submission event in which the user submitted a second search string to search the electronic repository, said second search string submission event representing a transition by the user from the first search string to the second search string;
  determining that the first and second search strings are sufficiently similar in spelling to treat the transition as a search string spelling change event;
  identifying one or more intervening events initiated by the user subsequent to the first search string submission event but prior to the second search string submission event;
  calculating a weight for the search string spelling change event, said weight being dependent upon the one or more intervening events and representing a non-zero amount of weight to give to the search string spelling change event;
  using said weight, in combination with weights corresponding to other search string spelling change events, to perform an assessment of whether the second search string represents a useful alternative spelling of the first search string, wherein each of said search string spelling change events is specific to a particular user, and at least some of the search string spelling change events correspond to different users than other search string spelling change events; and
  storing a result of said assessment in computer storage.

54. The method of claim 53, wherein calculating the weight comprises taking into consideration the number of said one or more intervening events that occurred between the first and second search string submission events.

55. The method of claim 53, wherein calculating the weight comprises taking into consideration an amount of time between the first and second search string submission events.

56. The method of claim 53, wherein calculating the weight comprises taking into consideration a type of an intervening event that occurred between the first and second search string submission events.

57. The method of claim 53, wherein calculating the weight comprises taking into consideration whether the user selected a search result item after submitting the second search string.

58. The method of claim 53, wherein the method comprises using said weights to calculate a probability of occurrence of a spelling change from the first search string to the second search string, and using the probability of occurrence to assess whether the second search string represents a useful alternative spelling of the first search string.

59. The method of claim 53, wherein the weight value reflects a degree of nexus between the first and second search string submission events.

* * * * *